(12) United States Patent
Batchelder et al.

(10) Patent No.: US 6,381,042 B1
(45) Date of Patent: Apr. 30, 2002

(54) AUTOMATED NEGATIVE SCANNER

(75) Inventors: Lee Batchelder, Derry; William Langille, Amherst, both of NH (US); Steve Giordano, Jr., Vienna, VA (US)

(73) Assignee: L.A. Batchelder and Sons Consulting, Inc., Derry, NH (US)

( * ) Notice: Subject to any disclaimer, the term of this patent is extended or adjusted under 35 U.S.C. 154(b) by 0 days.

(21) Appl. No.: 09/150,305

(22) Filed: Sep. 9, 1998

Related U.S. Application Data

(60) Provisional application No. 60/058,366, filed on Sep. 10, 1997.

(51) Int. Cl.[7] .................................................. H04N 1/04
(52) U.S. Cl. ........................ 358/487; 358/498; 358/506
(58) Field of Search ................................ 358/487, 506, 358/498, 505; 355/41, 32; 348/96, 97

(56) References Cited

U.S. PATENT DOCUMENTS

| | | | |
|---|---|---|---|
| 3,619,483 A | 11/1971 | Boots | 178/5.2 D |
| 5,088,813 A | 2/1992 | Wakefield | 352/183 |
| 5,146,341 A | 9/1992 | Erck et al. | 358/214 |
| 5,461,492 A | 10/1995 | Jones | 358/487 |
| 5,475,423 A | 12/1995 | Eiberger | 348/97 |
| 5,668,645 A * | 9/1997 | Yamap | 358/487 |
| 5,673,104 A * | 9/1997 | Rottner | 355/75 |
| 5,844,226 A | 12/1998 | Suzuki | 235/462 |
| 5,864,387 A * | 1/1999 | Reed et al. | 355/40 |
| 5,880,819 A * | 3/1999 | Tanaka et al. | 355/75 |
| 5,883,698 A * | 3/1999 | Kimura | 355/38 |

* cited by examiner

*Primary Examiner*—Cheukfan Lee
(74) *Attorney, Agent, or Firm*—Grossman, Tucker, Perreault & Pfleger, PLLC

(57) ABSTRACT

An automated negative scanner that sequentially positions photographic image-bearing negative film relative to an image gathering device which electronically captures a negative film image and digitizes the image without relying on DX code information regarding exposure conditions. The automated scanner comprises a feed spool and a take-up spool for image-bearing negative film, each spool connected to a motor for rotational movement wherein the feed spool and take-up spool are separated by a negative capture area, and wherein the feed spool holds a plurality of negative film rolls spliced together. The negative capture area contains a belt transport to transport the negative film and two dancer rollers connected to a tensioned lever arm each separately associated with both of the feed spool and take-up spool wherein the dancer rollers separate the rollers rotational movement from the transport of the film in the negative capture area. The negative capture area also contains a continuous source of light and a notch detector to center the imaged areas of the negative with respect to the image gathering device as well as two splice detectors and a bar code reader to identify and distinguish between the spliced single film rolls on the feed roller.

11 Claims, 5 Drawing Sheets

AUTOMATED NEGATIVE SCANNER

CROSS-REFERENCE TO RELATED APPLICATIONS

This application claims the benefit of U.S. Provisional Application No. 60/058,366, filed Sep. 10, 1997.

FIELD OF THE INVENTION

The present invention is directed at an automated negative scanner that sequentially positions photographic negatives within the view of a CCD camera which electronically captures the negative image and digitizes said image without relying on a DX code.

BACKGROUND OF THE INVENTION

As sensor technology has evolved from analog to digital it enabled imaging technologies to follow suit. Customers today request images as digital files to be displayed, changed and printed from personal computers.

The photo finishing industry has responded to that new technology by offering 'photos on floppy'. That is, photographs captured on negatives are subsequently electronically scanned and offered as digital files stored on various media types or through the Internet access on a data base. As volumes have risen for this service, the photo finishing industry required a means of scanning and digitizing negatives rapidly. To fulfill the need a couple of scanning machines have been offered which were able to scan negatives at the rate of one per second.

In a standard photo finishing processing laboratory, individual 35 mm rolls are typically spliced together into a single continuous roll of film. The specific customer information associated with the individual film rolls is imprinted onto the splice in the form of a bar code. These machines accept reels of these spliced negative rolls and sequentially advance the reel to present each frame to a CCD capture camera that electronically records each frame and subsequently digitizes it into a discrete file. Each frame is centered to the camera by means of detection of a notch that has previously been notched into the film at the center of each image. Each splice also has bar coded information of individual customers on it and these machines therefore have a bar-code reader that decodes and sends the information along with the digitized files to the computer for subsequent sorting. In addition, each roll of film in the reel has a DX Code imprinted on it which delineates its film type, ASA speed and manufacturer. These machines therefore also contain a DX Code reader which feeds back this information to the illumination source and camera to optimize the exposure conditions for the CCD capture.

Such scanning machines, however, have a number of shortcomings which reduce the efficiency of the process and increase the number of defects produced. The most troublesome shortcoming of these machines occurs at the point of detection between two different rolls of films. That spot, as noted, is called a splice. The scanning machines are supposed to detect a splice and then read the bar code printed on it that is associated with the following role of film. Frequently these machines falsely detect frame edges as a splice during an operation and assign a default order number to it (since it did not find a bar code associated with the splice). This causes an error reading as soon as it detects the next real splice and the scanning machines then shut down. Previous film rolls must then be manually reworked and re-scanned, causing work delays and lost time. In addition, at times, scanning machines will also miss a splice and thus assign two rolls of film to the same customer. This usually goes undetected until the customer complains.

Yet a third detection problem comes from the DX Code reader. That is, the DX Code reader when unable to read the film type will automatically assign a default setting, thereby rendering the scanned file with poor image quality.

Mechanically, scanning machines have employed a servo motor to provide accurate motion to the negative real. Servo motors, however, need to rely on assuring predictable motion of the film in order to afford the apparatus accurate positioning capability. This necessitates high load contact between two pressure rollers that translate rotational movement into the linear motion of the film. This results in scuffing and scratching of the negatives as they pass through the rollers. This is undesirable because it compromises the images rendering them unsuitable for further duplication. Furthermore, this type of machine does not allow for the digitization of cut negatives. Missed orders sometimes have to be scanned after they have already been cut into strips.

Finally the scanning machines to date have used high intensity incandescent light sources in proximity to the film. The heat generated by these sources tend to buckle and distort the negatives being captured and causes distortion in the digitized image.

It is therefore an object of this invention to present an improved automated negative scanner that solves the above problems of the prior art. More specifically, it is an object of this invention to provided an improved automated negative scanner that sequentially positions photographic negatives in the view of a CCD camera and electronically captures the images and digitizes said images without relying upon the negative DX code.

SUMMARY OF THE INVENTION

An automated negative scanner that sequentially positions photographic image-bearing bearing negative film relative to an image gather device which device electronically captures said negative film image and digitizes said image without relying on a DX code. The scanner comprises a feed spool and a take-up spool for said image-bearing negative film, each spool connected to a motor for rotational movement wherein said feed spool and take-up spool are separated by a negative capture area. The feed spool is designed to hold a plurality of negative film rolls spliced together and the negative capture area contains a belt transport to transport the negative film. Two dancer rollers are connected to a tensioned lever arm and each dancer roller is separately associated with said feed spool and said take-up spool wherein said dancer rollers separate said rollers rotational movement from said transport of said film in said negative capture area. The negative capture area also contains a notch detector to center the imaged areas of said negative with respect to said image gathering device along with two splice detectors and a bar code reader to identify and distinguish between said spliced single film rolls on said feed roller.

DETAILED DESCRIPTION OF THE PREFERRED EMBODIMENTS

The present invention was conceived to solve the quality and functional problems of the prior art systems noted above. For example, to solve the splice detection problems a double splice reader that is preferably spread apart by at least ¼" is outfitted to both eliminate false readings and increase detection frequency. To prevent DX reading problems, its input is altogether eliminated as a variable and instead a universal algorithm is introduced into the capture routine. This eliminates dependence on film variations from different manufacturers, lots and ASO speeds by automatically compensating for film base and exposure level. In addition a constant illumination source is introduced as opposed to the variable one present in the other machines. However, the DX code is still relied upon for detection of individual frame sequence.

To solve the reported overheating of the negative film, the light source is preferably a fluorescent one rather than an incandescent source, which can be used in direct line of sight of the film while imparting little thermal stress to the negatives.

In addition, to solve the reported problems of film scuffing, accurate film motion is only controlled in the scanning area, where precise motion is most crucial. The film transport mechanism in the negative capture area is provided via a belt system that holds the negatives at their edge on both sides. This also allows cut film strips to be fed (and automatically scanned) into the negative capture area one-by-one without the need for re-splicing them or using a slow flat bed scanner or single negative scanner. Outside the negative capture area low fiction idler rollers move the film form the unwind reel to the take-up reel. The shape of the rollers is also designed to make contact with only the edges of the film.

A preferred embodiment of the present invention will now be described with reference to the accompanying drawings. As previously noted, the automated negative scanner of the present invention provides a means for rapidly digitizing a large number of photographic negatives. The scanner functions to sequentially present negatives to a CCD camera that electronically captures the negative's images and converts them into digital files ready for storage.

Figure 1:
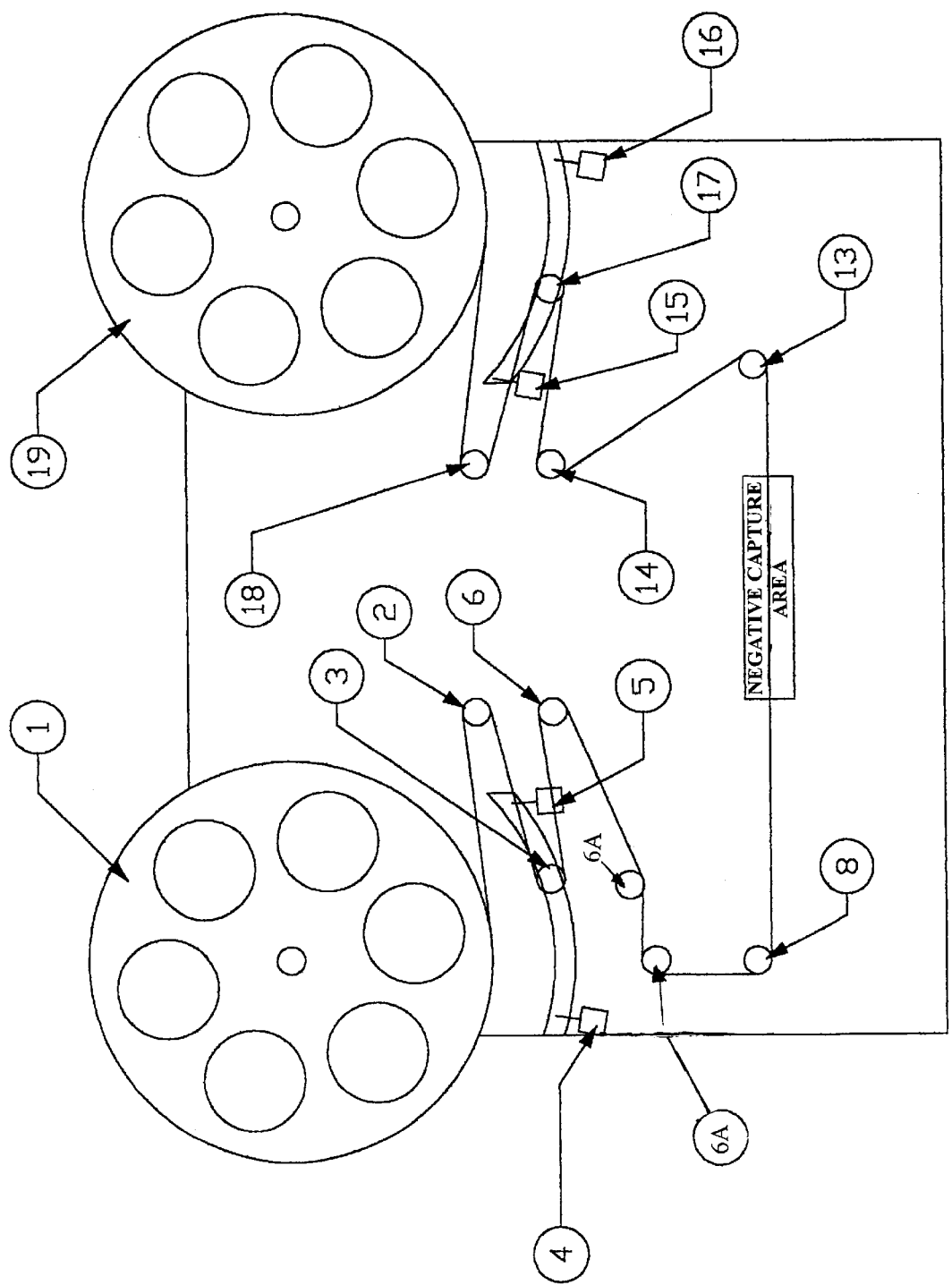
FIG. 1 is a front view showing the structure of the automated negative scanner in accordance with the present invention.

FIG. 1 depicts a plan view of a preferred embodiment of the automated negative scanner of the present invention. In a photographic processing laboratory, a large number of film rolls are handled simultaneously by splicing them together into a single long roll. The long continuous exposed and developed photographic film is rolled onto a 16" reel and is mounted on the unwind spool 1 and routed over rollers 2, 3, 6 and 8 then through the negative capture area and over rollers 13, 14, 17 and 18 and onto take-up spool 19 to be wound back up onto a 16" reel for the next operation in the photo processing laboratory.

Figure 2A:
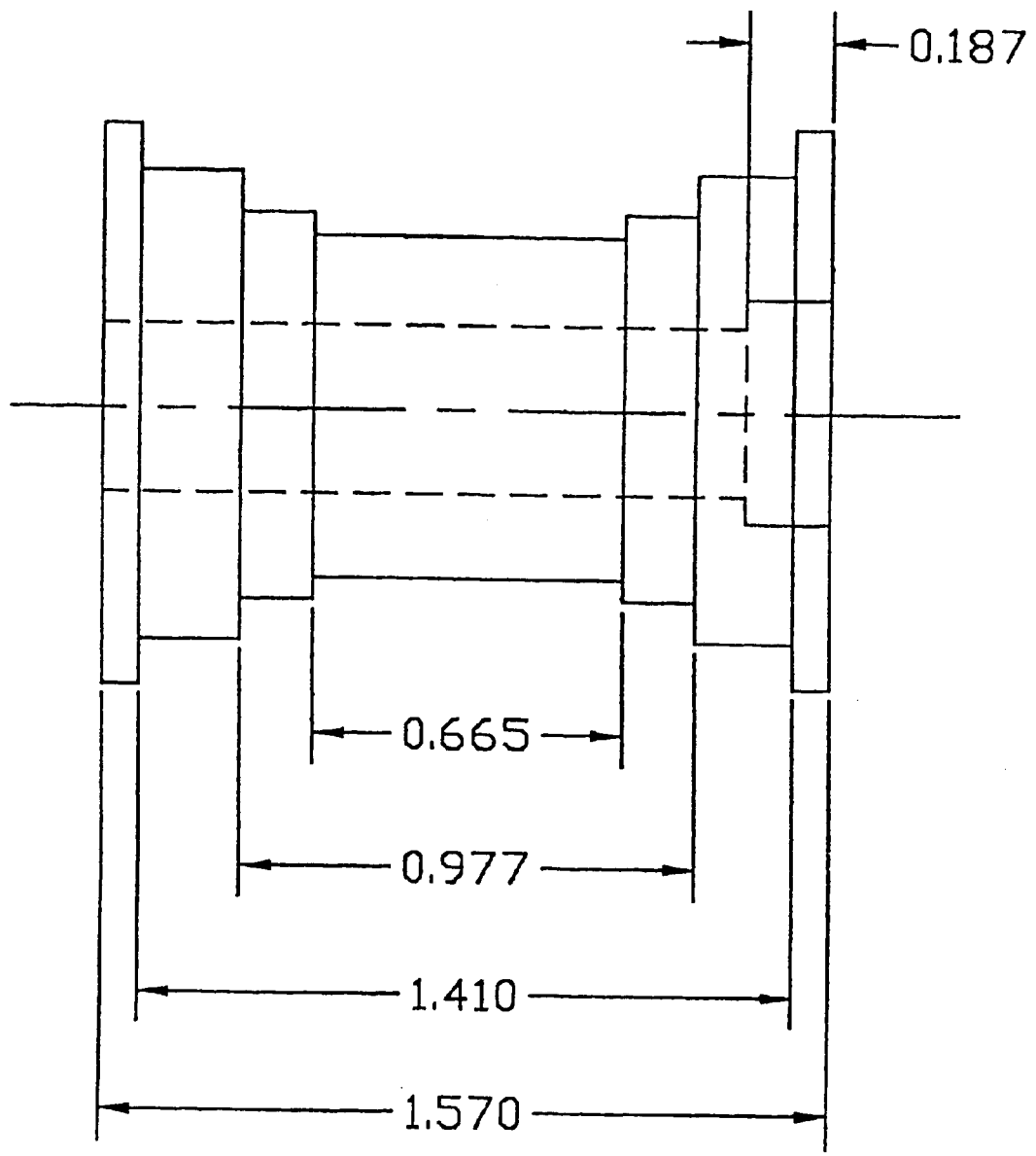
FIGS. 2A and 2B depict the idler rollers in respective side view and cross-section.
Figure 2B:
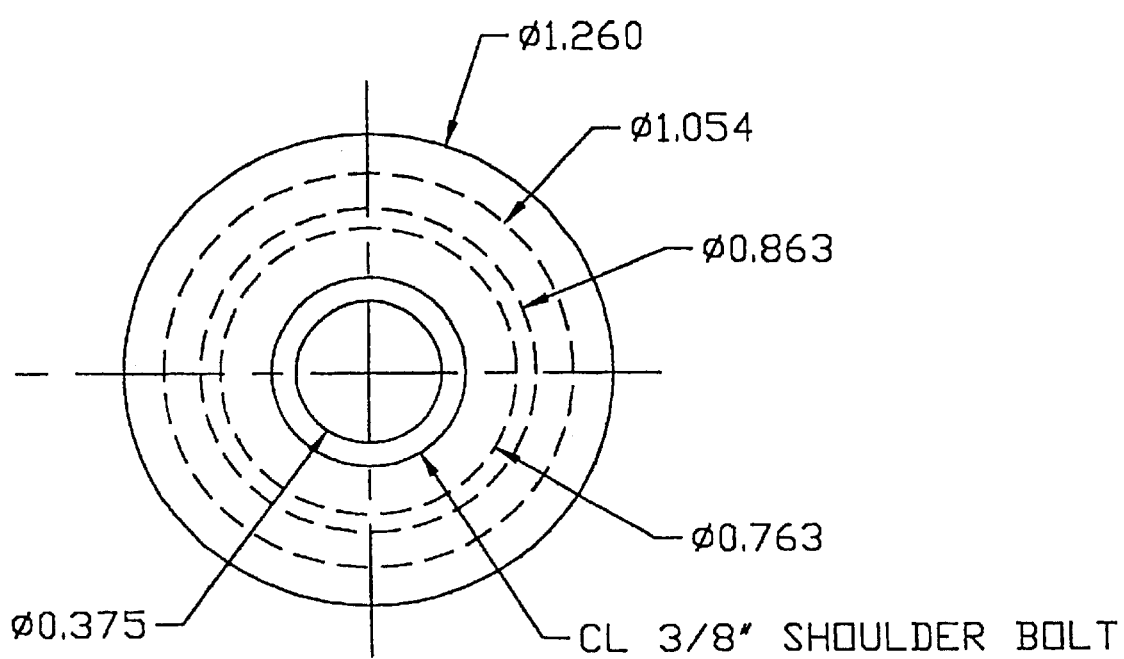

Rollers 2, 6, 8, 13, 14 and 18 are simple idler rollers that are free to move and serve to only change the translational direction of the film. FIGS. 2A and 2B depict the preferred roller configurations, including preferred distance between roller edges, and preferred roller diameters, in inches. The rollers are thus designed to make contact only with the edge of the negatives so as not to scratch them in the imaged areas. There are two series of steps in the rollers to accommodate two different film sizes, i.e., 35 mm and APS. They are desirably fabricated from a low abrasion engineering plastic such as Delrin™, Teflon™ or Nylon™. In addition, shown at 6A are a pair of rollers that are preferably incorporated to function specifically as cleaning rollers, commercially available as "PFT rollers", for film cleaning.

Rollers 3 and 17 also bear the same design, however, they serve a slightly different functions than the idler rollers. They are dancer rollers, which are idler rollers affixed on a lever arm connected to a counterweight, and are precisely weighted to control the tension of the film from the unwind and take up spools. Alternately, the dancer rollers can be outfitted with springs to control the tension. However, the repetitive motion back and forth of the dancer rollers will weaken the stiffness of the spring and vary the tension of the film over time. Thus, in a preferred embodiment, a counterweight is used to maintain tension.

The unwind spool 1 is outfitted with an AC synchronous motor that unwinds the film. As the film is released, the lever with dancer roller 3 moves to the left to maintain film tension. When it reaches proximity switch 4, the motor in spool 1 turned off. Timing belts 25 and 26 (FIG. 3) are on continuously and sequentially position the negatives in the center of the negative capture area. As the timing belts move the negatives, the lever with Dancer roll 3 moves back to the right. When it reaches proximity switch 5, the AC motor in the unwind spool 1 is turned back on to supply the next group of frames from the film roll. The above sequence of actions serves to separate the motion of the spool from the motion of the film in the negative capture area. This asynchronous movement negates the necessity of continuously matching the linear speed of the belt to the rotational speed of the reel as the film unwinds from the reel. This greatly simplifies film motion control throughout the device.

On the other side of the negative capture area, the lever arm with dancer roller 17 attached to it moves to the right as negatives are being moved through the negative capture area. When it reaches proximity switch 16 the AC motor of take up roll 19 is turned on to wind up the film. As it does, the lever arm with dancer roll 17 will consequently move to the left and when it reaches proximity switch 15 it turns off the AC motor of take up roll 19. This describes the overall motion of the film from the unwind to the take-up reel.

Figure 3:
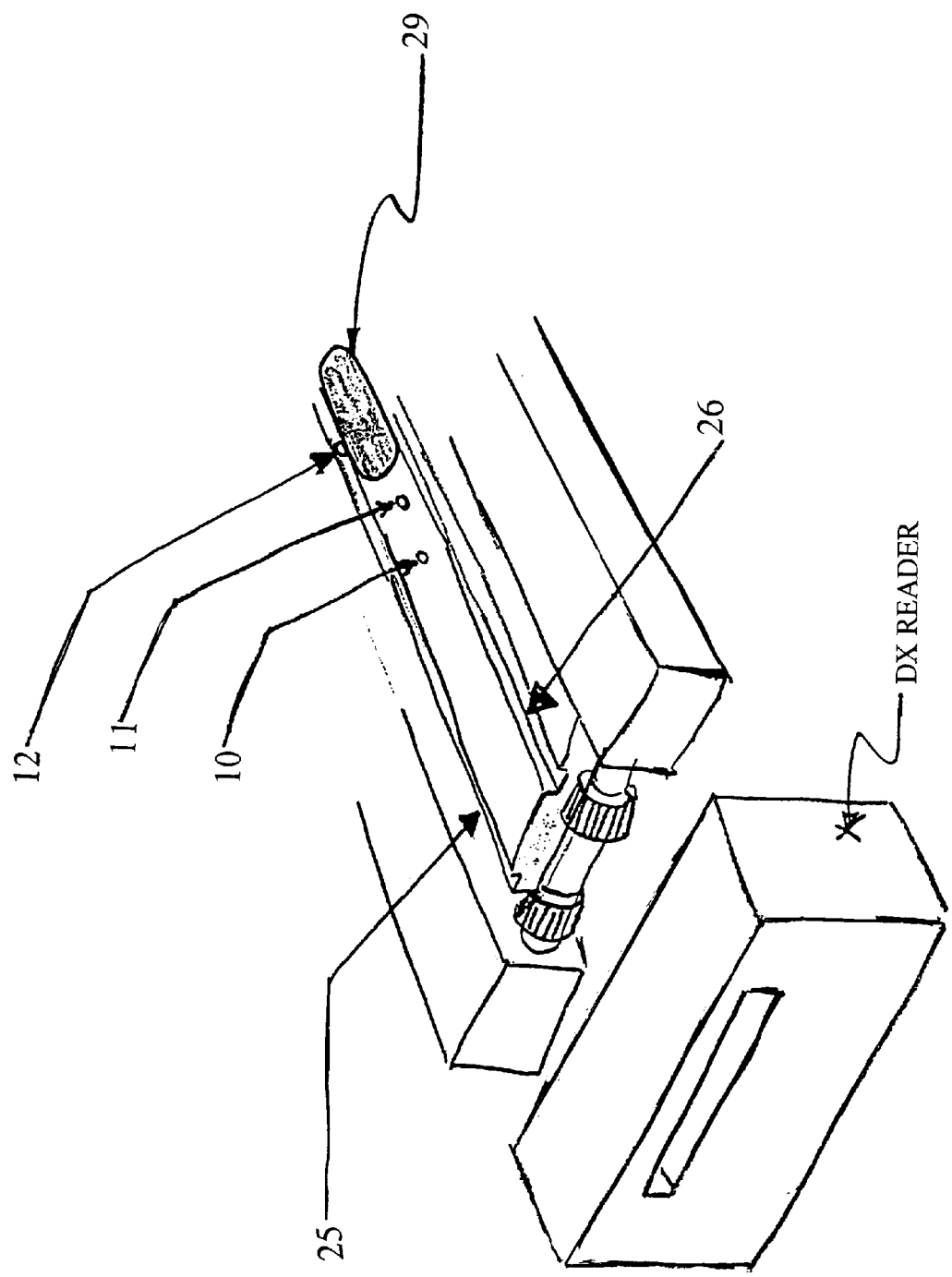
FIG. 3 illustrates the negative capture area of the automated negative scanner shown in FIG. 1.

FIG. 3 is a close-up view of the negative capture area. In it the film motion is controlled via timing belts 25 and 26 with their own separate drive mechanism. A first of two splice detectors 10 is situated in the film track area. In order to avoid misreading negative frame edges as splices, a second splice detector 11 is preferably situated at least 0.25" from the first one and preferably 0.5" away to serve as a verifier for the first splice detector. Since each splice is designed to be about 0.5" long, two detectors spaced about a half inch apart will minimize false readings.

A notch detector at 12 (FIG. 3) senses the center of an image and activates a dynamic break system outfitted to the belt drive DC motor (stepper motor). A fluorescent light source is situated below the capture frame area (29 in FIG. 3) and is constantly energized at the same intensity. In the preferred embodiment the use of fluorescent light is employed to minimize the thermal stress imparted to the negatives as well as increase the longevity of the illumination system (7000 hours for fluorescent versus 40 hours of halogen lamps). Alternatively, a fiber optic cable outfitted with an IR filter can be employed to reduce thermal stress on the negatives instead of the proximal light source now used. This, however, will not extend the life of the illumination source as the fluorescent lamp does.

Directly above the capture frame area 29 is preferably a high resolution 12 bit scientific grade 1 black and white CCD digital camera outfitted with an IR filter. In front of the camera is a variable color LCD filter. The camera records the designated negatives on its CCD array as they are positioned one-by-one in front of it. A filter in the camera modulates between the three primary colors (i.e., red, green and blue) while the camera records each negative three separate times under each color. The data of the three images are then fed into a computer which subsequently merges the three separate image planes into a single true color image. A color-curve program next determines exposure level and film base via a subroutine that separately analyzes the histogram of each of the three color images. From each pixel the software selects the best 8 out of 12 bits that most depict the image in the visible range of the spectrum and saves that data back into the true color image. The selection routine is based on a search for the string of 8 bits that displays the most complete bell curve of voltages out of the 12 bits. The IR filter in front of the CCD array ensures increased visible light sensitivity.

FIG. 3 also shows the preferred placement of the optional DX reader. As noted, in accordance with the present invention, the DX reader is employed only for the purpose of facilitating the detection of individual frame sequence.

Figure 4:
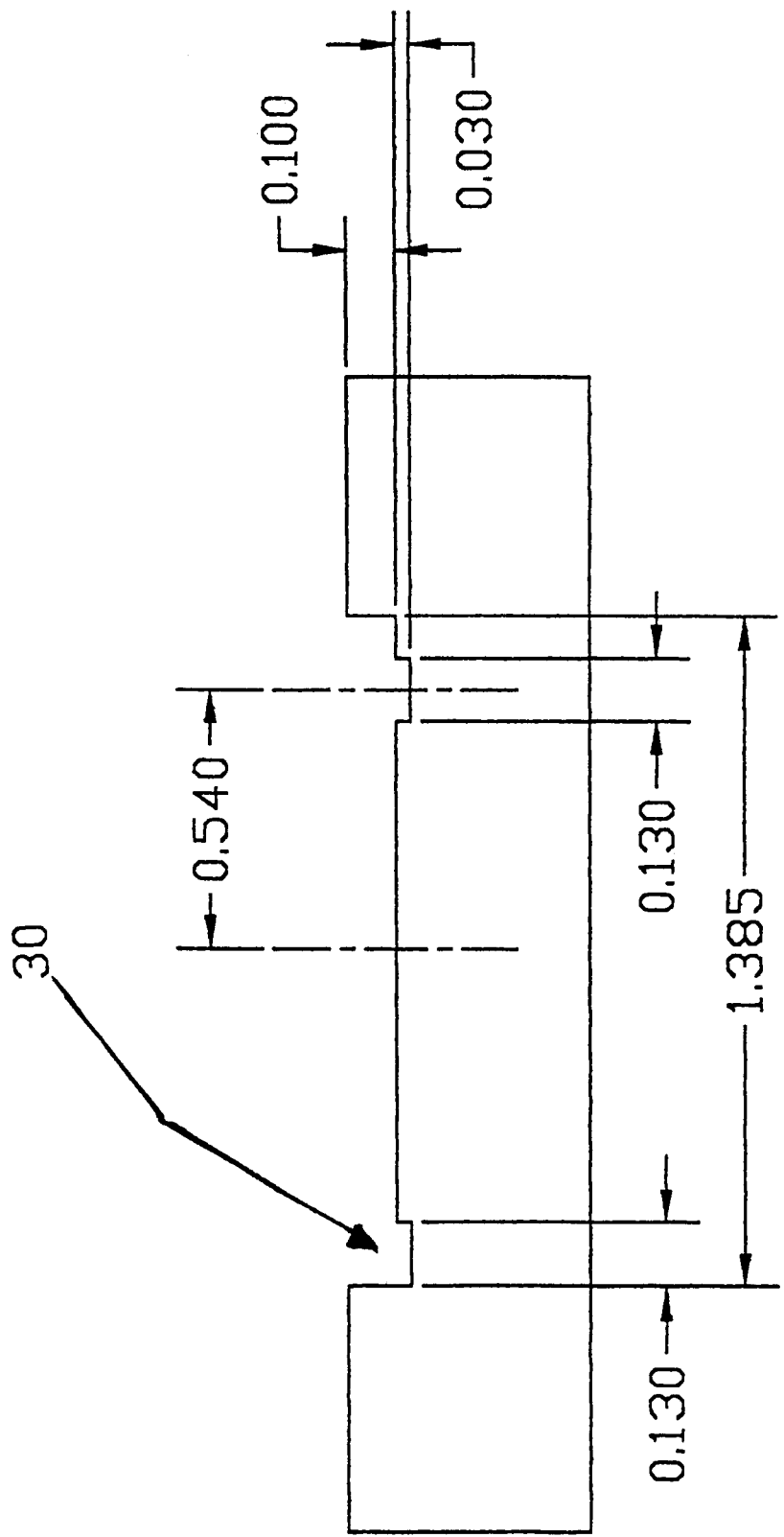
FIG. 4 is a cross-section of the film guide rails in the negative capture area.

Within the negative capture area motion control the timing belts are guided by tracks 30 (FIG. 4) machined into the aluminum body of the negative capture area on either side of the moving film. FIG. 4 also shows preferred dimensions, in inches, within the negative capture area. As can be seen, the tracks serve to suspend the imaged areas of the film such that no contact is made in that area. The film moves along with the timing belt which rides in the aluminum track. A Delrin™ cover plate is designed to impart pressure in the pin area only to ensure proper contact pressure of the film to the timing belt. Timing belt motion is controlled via a DC motor connected to a drive gear which matches the pitch of the timing belt.

We claim:

1. An automated negative scanner that sequentially positions photographic image-bearing negative film relative to an image gathering device which device electronically captures said negative film image and digitizes said image without relying on DX code information regarding exposure conditions, comprising:

a feed spool and a take-up spool for said image-bearing negative film, each spool connected to a motor for rotational movement wherein said feed spool and take-up spool are separated by a negative capture area, and wherein said feed spool holds a plurality of negative film rolls spliced together and wherein said negative capture area contains a belt transport to transport said negative film;

two dancer rollers connected to a tensioned lever arm each separately associated with both said feed spool and said take-up spool wherein said dancer rollers separate said rollers rotational movement from said transport of said film in said negative capture area;

said negative capture area also containing a continuous source of light and a notch detector to center the imaged areas of said negative with respect to said image gathering device as well as two splice detectors and a bar code reader to identify and distinguish between said spliced single film rolls on said feed spool.

2. The automated negative scanner of claim 1 wherein said image gathering device records each negative for each primary color image, wherein said image gathering device is connected to a processing database which identifies exposure level and film base by analyzing a histogram of each of said primary color images.

3. The automated negative scanner of claim 2 wherein an analysis of said histogram comprises analyzing each pixel and selecting about 8 out of 12 bits that substantially depict said negative image in the visible range of the spectrum and converting said bits into a color image.

4. The automated scanner of claim 1 wherein said light source is energized continuously.

5. The automated scanner of claim 1 wherein said light source is a fluorescent lamp.

6. The automated scanner of claim 1 wherein said light source is a fiber optic plate with an IR filter.

7. The automated scanner of claim 1 wherein said image gathering device is a 12 bit digital camera.

8. The automated scanner of claim 1 wherein said image gathering device contains an IR filter to substantially block the IR spectrum emanating from said negative and/or continuous light source.

9. The automated scanner of claim 1 wherein said image gathering device contains a variable color filter.

10. The automated scanner of claim 1 wherein said image gathering device contains a color LCD filter.

11. The automated scanner of claim 1 wherein said feed spool and said take-off spool use a synchronous AC motor.

* * * * *